US012591152B2

(12) United States Patent　(10) Patent No.:　US 12,591,152 B2
Kataoka et al.　(45) Date of Patent:　Mar. 31, 2026

(54) OPTICAL MODULATOR AND OPTICAL TRANSMISSION DEVICE USING SAME

(71) Applicant: SUMITOMO OSAKA CEMENT CO., LTD., Tokyo (JP)

(72) Inventors: Toshio Kataoka, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 271 days.

(21) Appl. No.: 18/022,707

(22) PCT Filed: Sep. 29, 2021

(86) PCT No.: PCT/JP2021/035752

§ 371 (c)(1),
(2) Date: Feb. 22, 2023

(87) PCT Pub. No.: WO2022/071355

PCT Pub. Date: Apr. 7, 2022

(65) Prior Publication Data

US 2023/0314851 A1　Oct. 5, 2023

(30) Foreign Application Priority Data

Sep. 29, 2020　(JP) ................................. 2020-163991

(51) Int. Cl.
　G02F 1/035　(2006.01)
　G02F 1/21　(2006.01)
　G02F 1/225　(2006.01)
(52) U.S. Cl.
　CPC .............. G02F 1/035 (2013.01); G02F 1/212 (2021.01); G02F 1/225 (2013.01); G02F 2202/20 (2013.01)

(58) Field of Classification Search
　CPC ........... G02F 1/035; G02F 1/212; G02F 1/225
　See application file for complete search history.

(56) References Cited

U.S. PATENT DOCUMENTS

2009/0304395 A1　12/2009　Hong
2014/0241659 A1　8/2014　Fukuda
(Continued)

FOREIGN PATENT DOCUMENTS

JP　2014-164243 A　9/2014
JP　2018-189699 A　11/2018
(Continued)

*Primary Examiner* — Chad H Smith
(74) *Attorney, Agent, or Firm* — IpHorgan Ltd.

(57)　ABSTRACT

It is possible to provide an optical modulator in which a transmission loss from a driver circuit element to a modulation substrate is reduced. An optical modulator includes a modulation substrate (1) that includes an optical waveguide (200) and a modulation electrode (10) for modulating a light wave propagating through the optical waveguide, a driver circuit element (2) that generates a modulation signal to be applied to the modulation electrode (10), and a case (3) that accommodates the modulation substrate (1) and the driver circuit element (2), in which an output terminal (20') that outputs the modulation signal is provided on an upper surface side of the driver circuit element (2), and a wiring substrate (4) including a wiring that electrically connects the output terminal (20') and the modulation electrode (10) is disposed above the driver circuit element (2) and the modulation substrate (1) to straddle both the driver circuit element (2) and the modulation substrate (1).

5 Claims, 8 Drawing Sheets

(56)     References Cited

U.S. PATENT DOCUMENTS

2017/0194308 A1*   7/2017  Evans ................. H04B 10/506
2021/0240049 A1*   8/2021  Abe ........................ G02F 1/212

FOREIGN PATENT DOCUMENTS

WO      2019/239683  A1    12/2019
WO      2020/115999  A1     6/2020

* cited by examiner

OPTICAL MODULATOR AND OPTICAL TRANSMISSION DEVICE USING SAME

CROSS REFERENCE TO RELATED APPLICATIONS

This application is a national stage completion application of PCT Application No. PCT/JP2021/035752, filed Sep. 29, 2021, and claims priority from Japanese Patent Application No. 2020-163991, filed Sep. 29, 2020. Each of these applications is incorporated by reference herein in its entirety.

TECHNICAL FIELD

The present invention relates to an optical modulator and an optical transmission apparatus, particularly, relates to an optical modulator including a modulation substrate that includes an optical waveguide and a modulation electrode for modulating a light wave propagating through the optical waveguide, a driver circuit element that generates a modulation signal to be applied to the modulation electrode, and a case that accommodates the modulation substrate and the driver circuit element.

BACKGROUND ART

In the optical communication field or the optical measurement field, an optical modulator using a modulation substrate including an optical waveguide and a modulation electrode for modulating a light wave propagating through the optical waveguide is frequently used. In recent years, the miniaturization/power consumption reduction of the optical modulator has progressed, for example, as disclosed in Patent Literature No. 1, development of an optical modulator in which an InP semiconductor electric/optical conversion element chip (modulation substrate) and a driver IC (driver circuit element) are accommodated in the same case has progressed.

In addition, in a case in which a modulation signal is also a microwave of 60 GHz or higher due to the demand for bandwidth widening, and the driver circuit element and the modulation substrate are connected by a wire bonding in the related art, an inductance component is increased and the high-frequency characteristic is deteriorated.

In the related art, the differential signal and a single-ended signal have been used as the modulation signal for driving the optical modulator. The differential signal has noise resistance and is effective for a line with a long wiring length, but is subjected to design restrictions related to the wiring and tends to have a large transmission loss. On the other hand, the single-ended signal is susceptible to noise from the outside, but has advantages of an easy design, a short wiring length, and a low transmission loss.

Due to recent advances in digital signal processing technology, a digital signal processor (DSP) device is often used in the optical transmission apparatus. Since the DSP device operates with a small signal, it is necessary to improve noise resistance from other devices, and the differential signal is often used as the modulation signal.

The modulation signal output from the DSP is wired using the differential signal to the driver circuit element disposed inside the case of the optical modulator. The driver circuit element has a structure in which signal amplifiers are combined in multiple stages, and the differential signal that has excellent signal quality in a case in which a wiring length of a transmission line is long is often used as the output signal. Therefore, the wiring length is also increased by wiring a plurality of signals from the driver circuit element to the modulation substrate. As a result, the deterioration of the transmission loss of the modulation signal is caused.

On the other hand, in order to widen the bandwidth, it is necessary to wire (shortest wiring) the modulation signal amplified by the driver circuit element to the electric/optical conversion element (modulation substrate) with as little transmission loss as possible. In addition, due to the miniaturization/integration of the modulation substrate, wiring to the modulation electrode is subjected to design restrictions, so wiring using the single-ended signal is desirable.

CITATION LIST

Patent Literature

[Patent Literature No. 1] Japanese Laid-open Patent Publication No. 2014-164243

SUMMARY OF INVENTION

Technical Problem

An object of the present invention is to solve the problems and to provide an optical modulator in which a deterioration of a high-frequency characteristic from a driver circuit element to a modulation substrate is suppressed. Another object of the present invention is to provide an optical modulator that can efficiently apply a differential signal output from the driver circuit element to a modulation electrode as a single-ended signal. In addition, still another object of the present invention is to provide an optical transmission apparatus using these optical modulators.

Solution to Problem

In order to solve the above object, an optical modulator and an optical transmission apparatus according to the present invention have the following technical features.

(1) An optical modulator including a modulation substrate that includes an optical waveguide and a modulation electrode for modulating a light wave propagating through the optical waveguide, a driver circuit element that generates a modulation signal to be applied to the modulation electrode, and a case that accommodates the modulation substrate and the driver circuit element, in which an output terminal that outputs the modulation signal is provided on an upper surface side of the driver circuit element, and a wiring substrate including a wiring that electrically connects the output terminal and the modulation electrode is disposed above the driver circuit element and the modulation substrate to straddle both the driver circuit element and the modulation substrate.

(2) The optical modulator according to (1), in which the wiring of the wiring substrate is electrically connected to the output terminal and the modulation electrode by a flip-chip bonding.

(3) The optical modulator according to (1) or (2), in which the wiring substrate is configured to receive differential signals from the driver circuit element and output only one signal of the differential signals to the modulation electrode.

(4) The optical modulator according to (3), in which an other signal of the differential signals is terminated by a terminator provided in the wiring substrate.

(5) The optical modulator according to (4), in which the terminator is provided on a surface of the wiring substrate positioned on a back side of a surface facing the modulation substrate.

(6) The optical modulator according to (4) or (5), in which heat radiation means for radiating heat generated from the terminator is provided in the wiring substrate.

(7) An optical transmission apparatus including the optical modulator according to anyone of (1) to (6), and a signal generator that generates a modulation signal to be input to the driver circuit element.

Advantageous Effects of Invention

According to the present invention, the optical modulator includes the modulation substrate that includes the optical waveguide and the modulation electrode for modulating the light wave propagating through the optical waveguide, the driver circuit element that generates the modulation signal to be applied to the modulation electrode, and the case that accommodates the modulation substrate and the driver circuit element, in which the output terminal that outputs the modulation signal is provided on the upper surface side of the driver circuit element, and the wiring substrate including the wiring that electrically connects the output terminal and the modulation electrode is disposed above the driver circuit element and the modulation substrate to straddle both the driver circuit element and the modulation substrate. Therefore, it is possible to provide the optical modulator in which a transmission loss from the driver circuit element to the modulation substrate is reduced.

Moreover, since the wiring substrate is configured to receive the differential signal from the driver circuit element and output only one signal of the differential signals to the modulation electrode, it is possible to provide the optical modulator that can efficiently apply the differential signal output from the driver circuit element to the modulation electrode as the single-ended signal.

DESCRIPTION OF EMBODIMENTS

Figure 1:
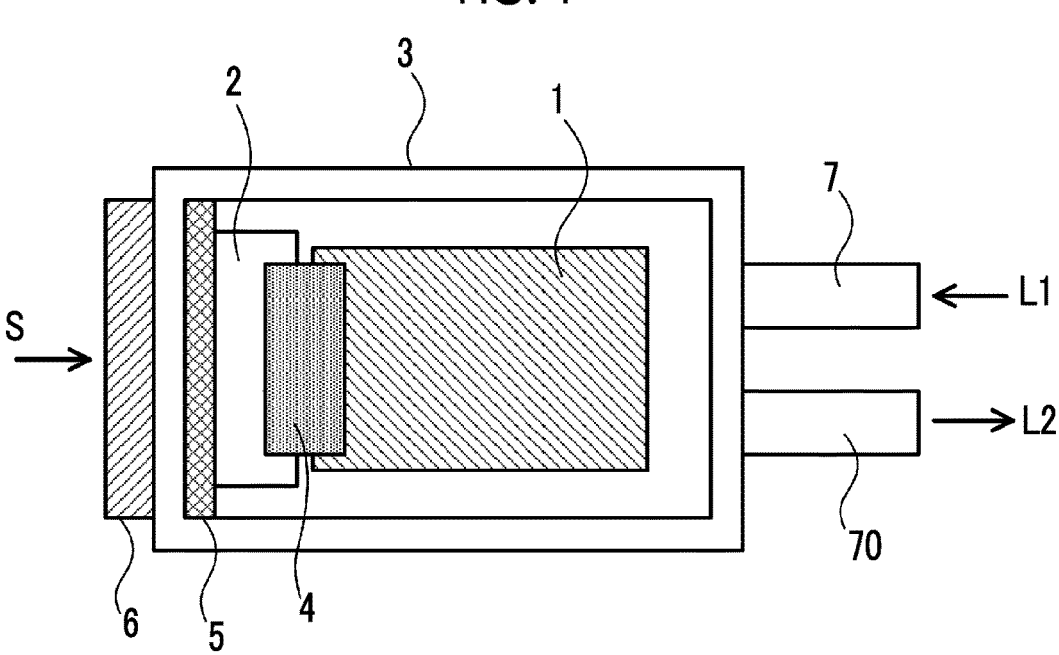
FIG. 1 is a plan view showing an example of an optical modulator according to the present invention.

Hereinafter, the present invention will be described in detail using preferred examples.

In the present invention, as shown in FIGS. 1 to 3 or FIGS. 4 to 6, an optical modulator includes a modulation substrate 1 that includes an optical waveguide 200 and a modulation electrode 10 for modulating a light wave propagating through the optical waveguide, a driver circuit element 2 that generates a modulation signal to be applied to the modulation electrode, and a case 3 that accommodates the modulation substrate and the driver circuit element, in which an output terminal that outputs the modulation signal is provided on an upper surface side of the driver circuit element, and a wiring substrate 4 including a wiring that electrically connects the output terminal and the modulation electrode is disposed above the driver circuit element and the modulation substrate to straddle both the driver circuit element and the modulation substrate.

As the modulation substrate, a ferroelectric substrate having an electro-optic effect, such as lithium niobate (LN), lithium tantalate (LT), lead lanthanum zirconate titanate (PLZT), or the like, or a reinforcing substrate on which a vapor deposition film of these materials is formed can be used.

In addition, a substrate using various materials such as a semiconductor material, such as InP or the like, an organic material, or the like, can also be used.

As a method of forming the optical waveguide, it is possible to use a rib type optical waveguide in which a portion corresponding to the optical waveguide is formed into a protruding shape on the substrate by etching a substrate surface other than the optical waveguide, forming grooves on both sides of the optical waveguide, or the like. In addition, it is also possible to form the optical waveguide by forming a high-refractive index portion on the substrate surface using Ti or the like by a thermal diffusion method, a proton exchange method, or the like. It is also possible to form a composite optical waveguide by diffusing a high-refractive index material in the rib type optical waveguide portion or the like.

The modulation substrate on which the optical waveguide is formed may be configured by a thin plate having a thickness of 10 μm or lower, more preferably 5 μm or lower, in order to achieve velocity matching between the microwave and the light wave of the modulation signal. In addition, a height of the rib type optical waveguide is set to 2 μm or lower, more preferably 1 μm or lower. In addition, it is also possible to form the vapor deposition film on the reinforcing substrate and process the film into a shape of the optical waveguide.

The modulation substrate configured by the thin plate adheres and is fixed to the reinforcing substrate by direct bonding or through an adhesive layer of resin or the like, in order to increase mechanical strength. As the reinforcing substrate to be directly bonded, a material having a refractive index lower than a refractive index of the optical waveguide and the substrate on which the optical waveguide is formed and a coefficient of thermal expansion close to a coefficient of thermal expansion of the optical waveguide or the like, for example quartz or the like, is preferably used. In addition, in a case of bonding to the reinforcing substrate through the adhesive layer, it is also possible to use the same material as the thin plate, such as an LN substrate or the like, as the reinforcing substrate.

The modulation electrode and a bias electrode are formed along the optical waveguide. As a method of forming the electrode, the electrode can be configured by laminating Au on a base metal, such as Au, Ti, or the like, by plating.

Figure 2:
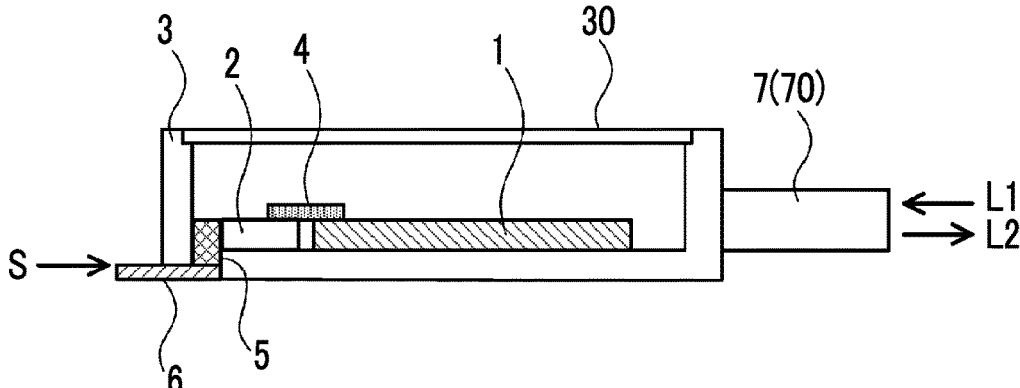
FIG. 2 is a side view of the optical modulator in FIG. 1.
Figure 4:
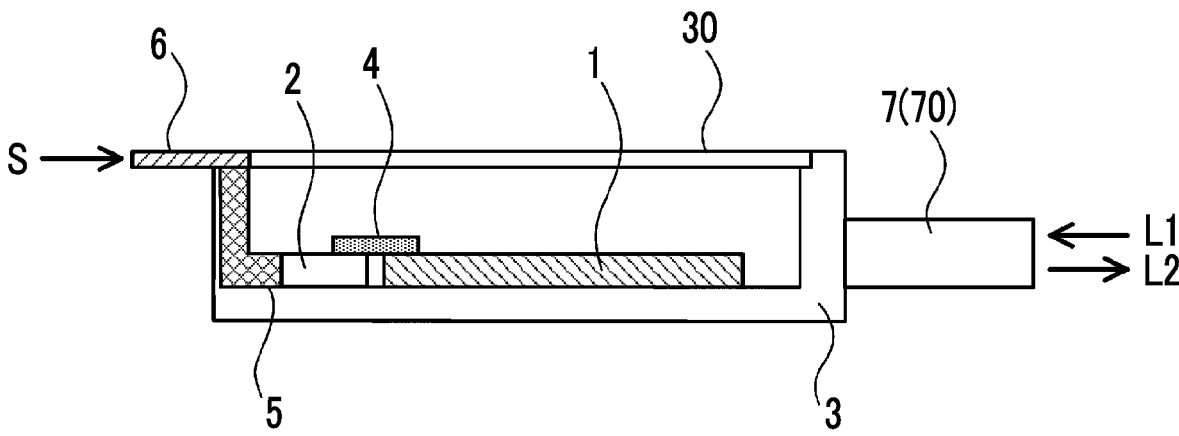
FIG. 4 is a side view showing another example of the optical modulator according to the present invention.

As shown in FIGS. 1 and 2, or FIG. 4, the driver circuit element 2 is disposed adjacent to the modulation substrate 1. The driver circuit element 2 has a configuration in which signal amplifiers are connected in multiple stages, and is configured to input the differential signal, which is the modulation signal, and output the differential signal. For example, a modulation signal S is generated by a digital signal processor (DSP) or the like disposed outside the case. The modulation signal S is introduced into the case 3 through electrical signal introduction means 6 as shown in FIGS. 1, 2, and 4. Various wiring means, such as a flexible wiring, a lead pin, a connector terminal, or the like, can be used as the electrical signal introduction means. Although the flexible wiring will be mainly described below, the present invention is not limited to this.

Figure 3:
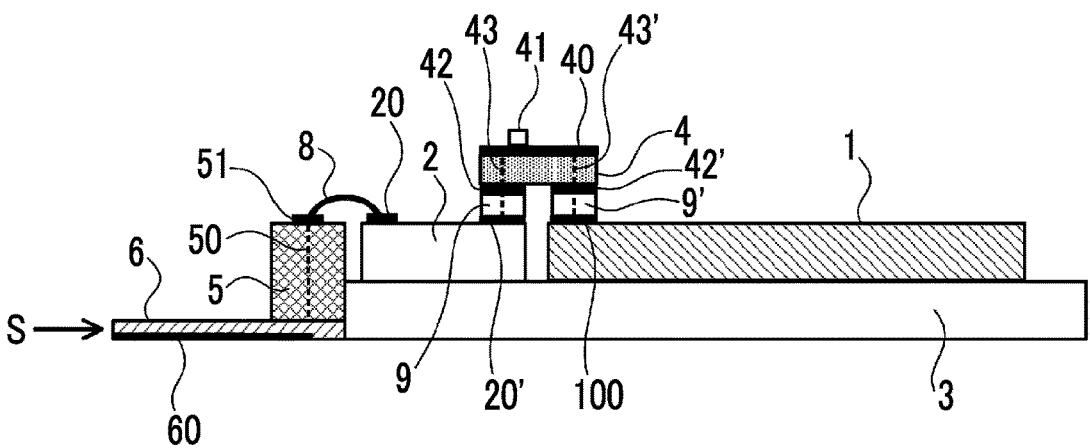
FIG. 3 is a side view showing a connection structure between a driver circuit element and a modulation substrate in the optical modulator in FIG. 2.
Figure 5:
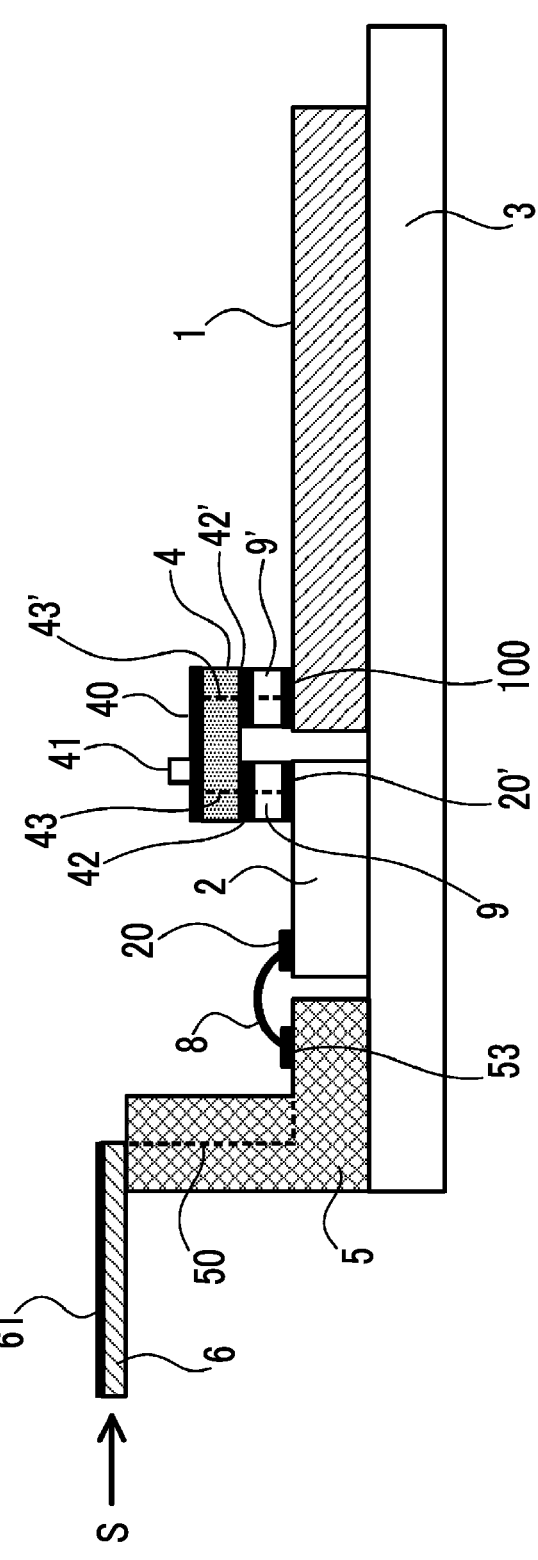
FIG. 5 is a side view showing the connection structure between the driver circuit element and the modulation substrate in the optical modulator in FIG. 4.

A flexible wiring 6, which is the electrical signal introduction means, is connected to a relay substrate 5 inside the case. As shown in FIG. 3 or 5, an electrical wiring 60 is formed on the flexible wiring 6, and an electrical wiring 50 is formed on the relay substrate 5, respectively. As a result, a path for an external electrical signal to reach an input terminal of the driver circuit element 2 is secured.

As shown in FIG. 1, a light wave L1 is input from the outside through an optical fiber to the optical waveguide of the modulation substrate 1 disposed inside the case 3. In addition, the light wave output from the modulation substrate 1 is output as output light L2 to the outside through the optical fiber. Reference numerals 7 and 70 indicate collimators incorporating lenses or the like. Reference numeral 30 in FIG. 2 or the like indicates a lid portion of the case 3.

As shown in FIG. 4, as the connection of light waves between the modulation substrate 1 and the collimators 7 and 70, the connection by a space optical system, such as a lens, a prism, or the like, is used. In particular, in a case of polarization beam combining of two output light, apart of an optical component, such as a polarization beam splitter or the like, is disposed inside the case. In addition, it is also possible to attach a lens block or the like to an end surface of the modulation substrate 1 to reduce the alignment adjustment work of the optical component.

Figure 6:
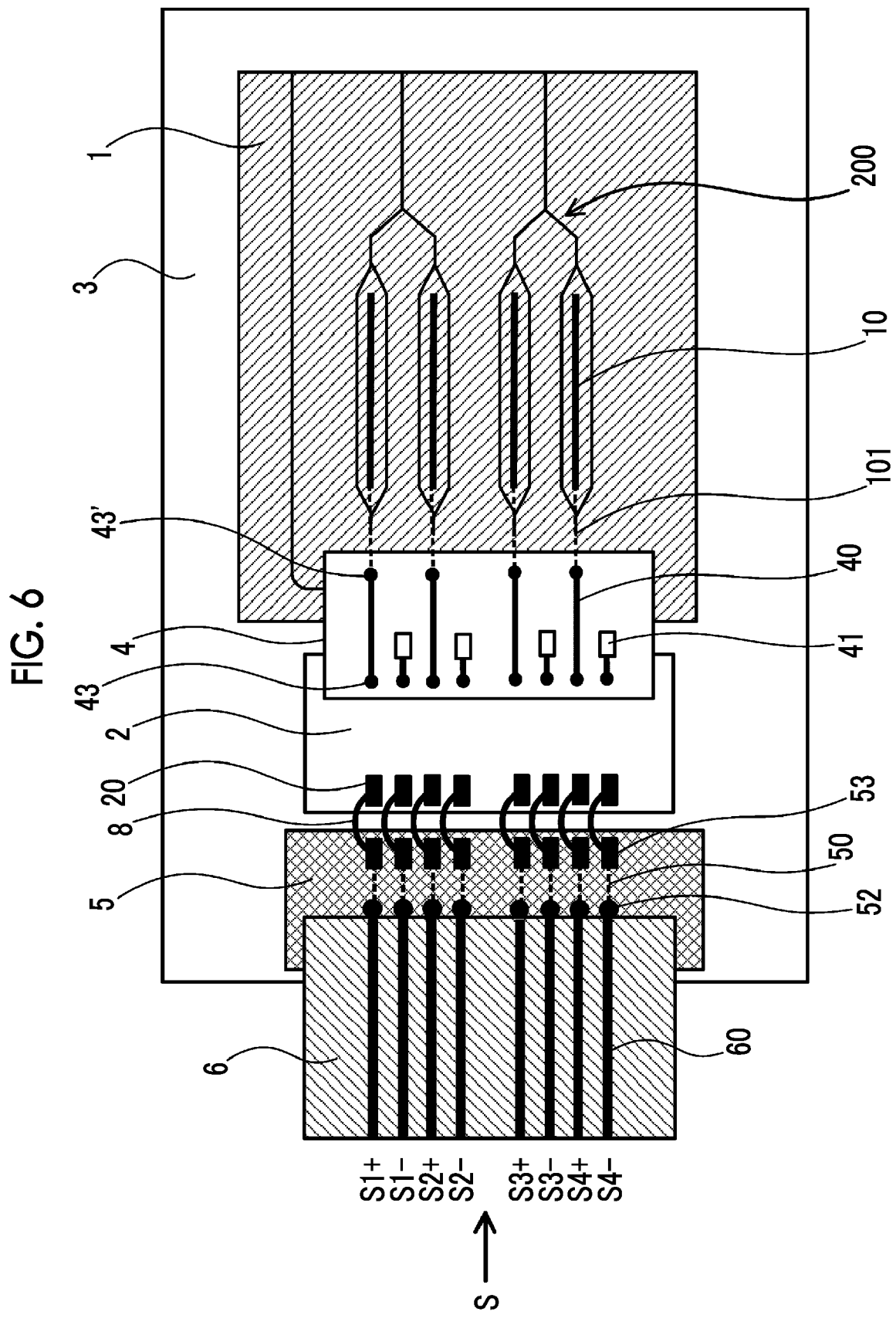
FIG. 6 is a plan view showing a part of the optical modulator in FIG. 5.

FIG. 3 is a diagram showing the configuration including the modulation substrate 1 and the driver circuit element 2 of FIGS. 1 and 2 in more detail. In addition, FIGS. 5 and 6 are diagrams showing the configuration including the modulation substrate 1 and the driver circuit element 2 in FIG. 4 in more detail. Although FIG. 6 is a plan view of FIG. 5, even in a case in which FIG. 6 is a plan view of FIG. 3, the drawing on the right side of the driver circuit element 2 in FIG. 6 is the same drawing.

As shown in FIG. 3, in a case in which the flexible wiring 6 is used, the wiring 60 is formed on a flexible printed circuit, further, the wiring 50 is provided in the relay substrate 5, and the wiring 60 is electrically connected to a pad portion 51 through the wiring 50. A pad portion 20, which is the input terminal of the driver circuit element 2, and the pad portion 51 are connected by a wire bonding 8.

In a case in which the electrical signal introduction means 6 (flexible or rigid substrate can be used) in FIG. 4 is used, as shown in FIG. 5, the wiring 60 of the electrical signal introduction means 6 and the input terminal (pad portion) 20 of the driver circuit element are electrically connected through the wiring 50 of the relay substrate 5. The wire bonding 8 is used for the connection between terminals. In addition, as shown in FIG. 6 which is a plan view of FIG. 5, a terminal for input 52 and a terminal for output 53 may be configured to be disposed separately on the relay substrate 5 and both terminals may be connected through the wiring 50.

An insulating substrate using alumina or aluminum nitride ceramic is used for the wiring substrate 4 that connects the driver circuit element 2 and the modulation electrode 10 of the modulation substrate 1, the electrical wiring is formed on an upper surface or a lower surface of the wiring substrate 4 in FIG. 3 or 5. In FIG. 6, a wiring 40 and a terminator 41 are disposed on an upper surface side of the wiring substrate 4.

In FIG. 3 or FIG. 5, a via 43 penetrating the wiring substrate 4 is formed, and the pad portion 42 provided on the lower surface of the wiring substrate 4 and the electrical wiring 40 provided on the upper surface are electrically connected. The connection between the wiring substrate (pad portion 42) and the output terminal (20') of the driver circuit element 2 or the connection between the wiring substrate (pad portion 42') and a pad portion 100 of the modulation electrode of the modulation substrate 1 is performed by a flip-chip bonding. Specifically, there is a method of forming both the pad portions with Au electrode pads and connecting the pad portions by pressure bonding by applying heat/vibration, bump connection with a conductive adhesive 9 (9'), or the like.

Figure 7:
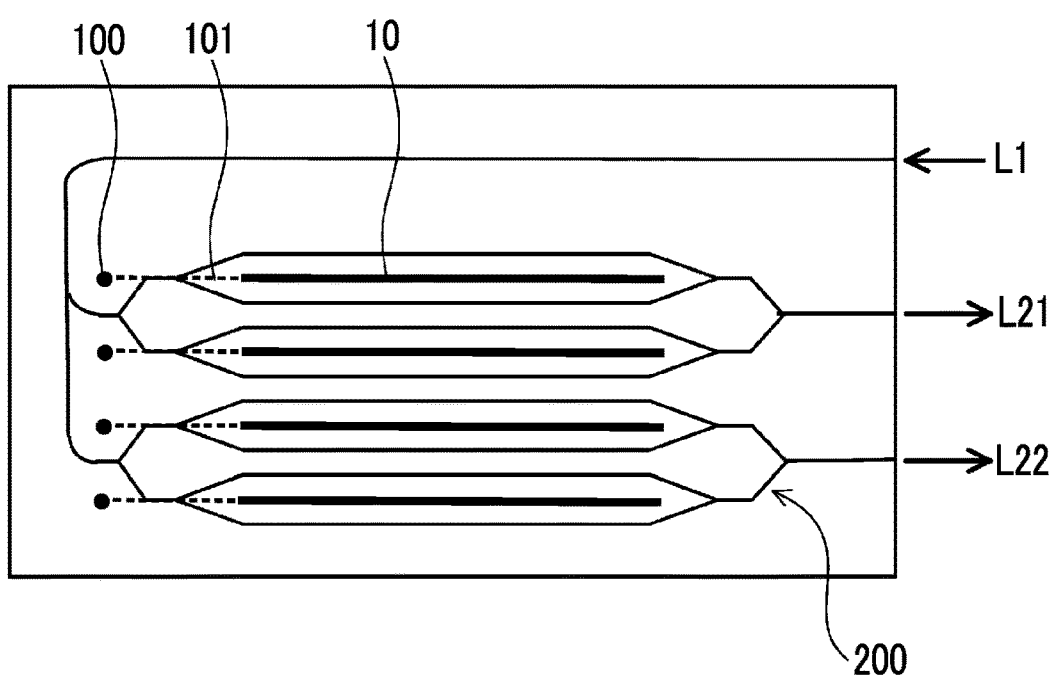
FIG. 7 is a plan view showing an example of the modulation substrate used in the optical modulator according to the present invention.

FIG. 7 is a plan view showing an example of the modulation substrate 1 used in FIG. 3, 5 (FIG. 6), or the like. As shown in FIG. 7, the optical waveguide 200 is formed on the modulation substrate 1, and the modulation electrode 10 is formed on an action portion of the optical waveguide 200. The modulation electrode includes a signal electrode and a ground electrode, and FIG. 7 shows only a part of the signal electrodes. In addition, it is also possible to provide the bias electrode for controlling a DC bias voltage of an interference type optical modulator using a Mach-Zehnder type optical waveguide.

The modulation electrode 10 is electrically connected by a wiring 101 to the input terminal (pad portion) 100 that inputs the modulation signal. In FIG. 7, the optical waveguide is configured to input and output the light wave from the same end surface of the modulation substrate, but the present invention is not limited to this, and the optical waveguide can also be configured to be bent at aright angle and to output light, which is input from one side surface of the modulation substrate, from a side surface adjacent to the side surface. In addition, it is also possible to form a long branched waveguide of the Mach-Zehnder type optical waveguide of the optical waveguide in FIG. 7 and bend the branched waveguide by 180 degrees.

Figure 8:
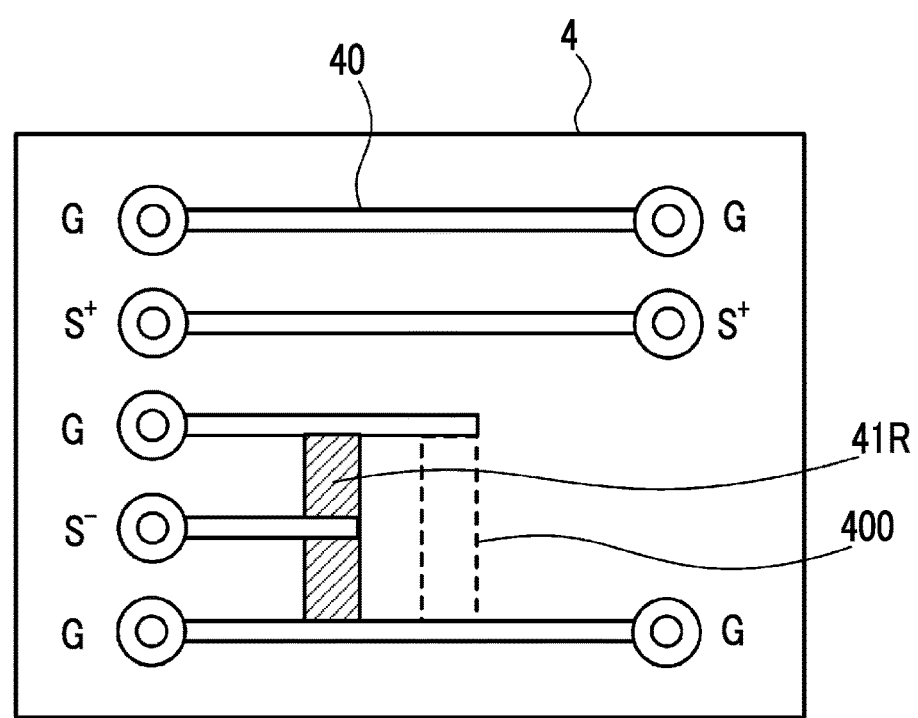
FIG. 8 is a diagram showing an example of a wiring substrate in the optical modulator according to the present invention.

FIG. 8 is a diagram showing an example of the wiring substrate 4. For simplification of description, only a wiring for one differential signal is shown.

The output signal of the driver circuit element is introduced to the left side of the wiring substrate 4 in FIG. 8, and the wiring 40 corresponding to the differential signal (S$^+$, S$^-$) and the ground (G) is provided on the wiring substrate 4. The disposition of the differential signal and the ground, and the number of wirings are set corresponding to the output terminal of the driver circuit element. In addition, in a case in which a plurality of modulation signals are output as in a case of using four differential signals in FIG. 6, similar wiring patterns are also provided in parallel on the wiring substrate 4 to correspond to the number of the modulation signals. It should be noted that the wiring for ground G may be used in common between adjacent wirings.

In FIG. 8, one signal (S⁺) of the differential signals is output to the modulation electrode as the single-ended signal, and the other signal (S⁻) is terminated by the terminator. The terminator can be configured by providing a termination resistor 41R between a signal wiring and a ground wiring. In addition, in order to absorb the microwave radiated from the end portion of the terminated signal wiring (S⁻), it is also possible to provide a portion 400 connecting the ground wirings to surround the signal wiring. In addition, the termination resistor 41R may be disposed as close to the electrode of the driver circuit element (left side in FIG. 8) as possible, in order to prevent unnecessary reflection of the S⁻ signal wiring.

As the configuration of the terminator, in addition to the disposition a resistor film as the termination resistor 41R as shown in FIG. 8, the terminator can be also configured as one chip-shaped electrical component incorporating a resistor or the like can be applied, and such a chip-shaped terminator is electrically connected to the wiring 40 on the wiring substrate 4 by a conductive adhesive and fixed.

Figure 9A:
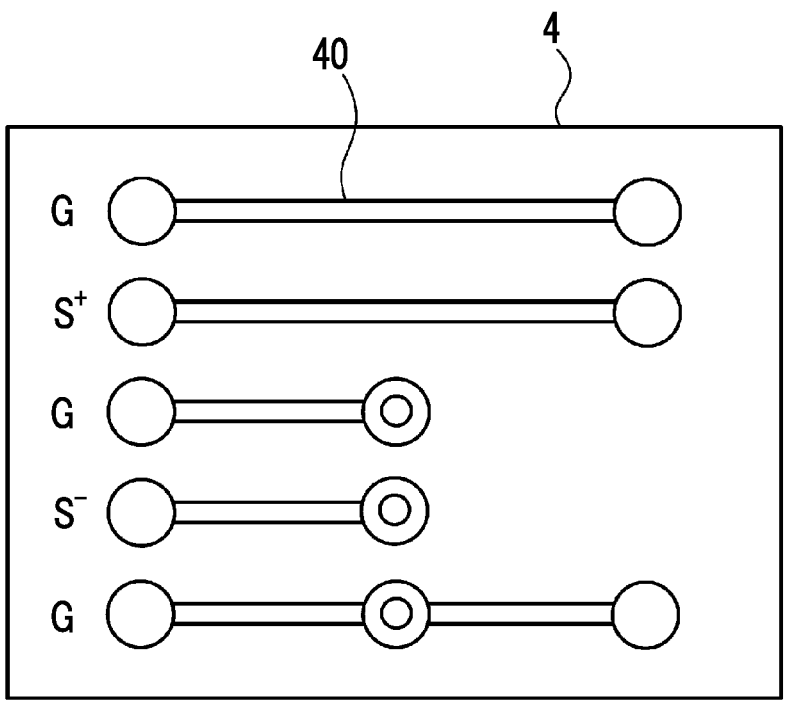
FIGS. 9A and 9B are diagrams showing another example of the wiring substrate in the optical modulator according to the present invention.
Figure 9B:
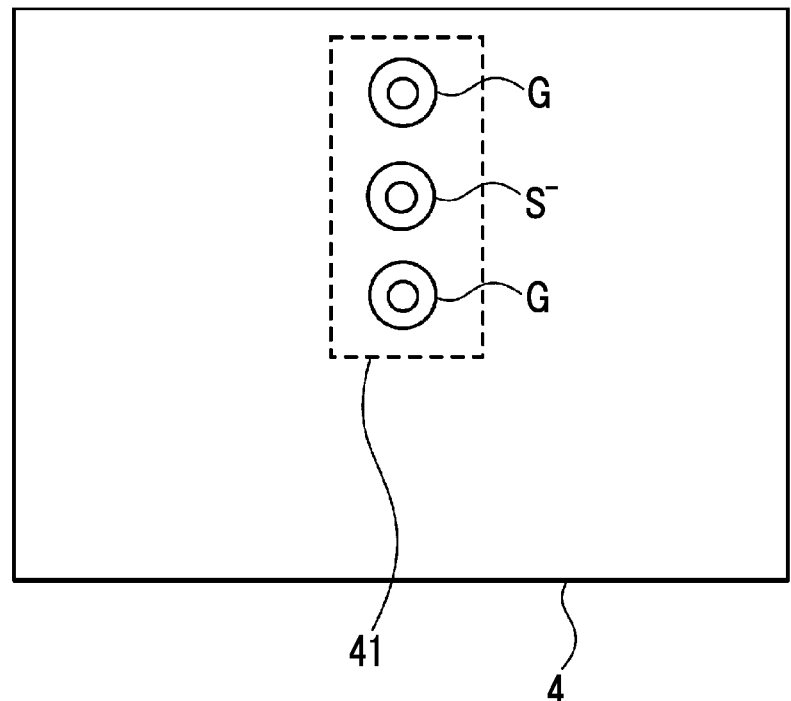
Figure 10A:
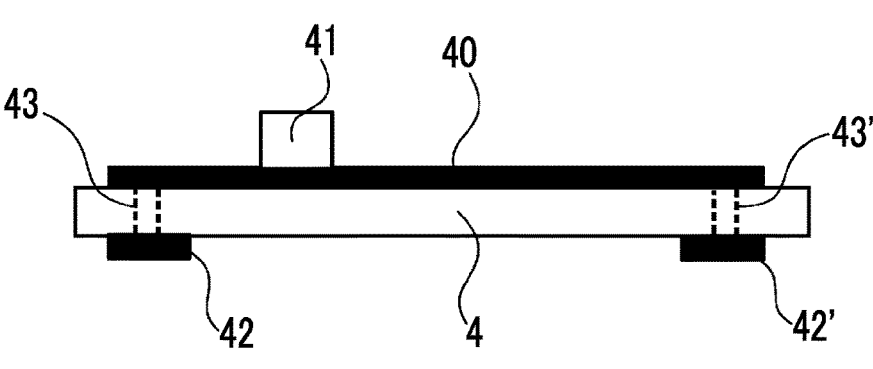
FIGS. 10A to 10D are diagrams for describing the layout of an electrical wiring and a terminator on the wiring substrate.
Figure 10B:
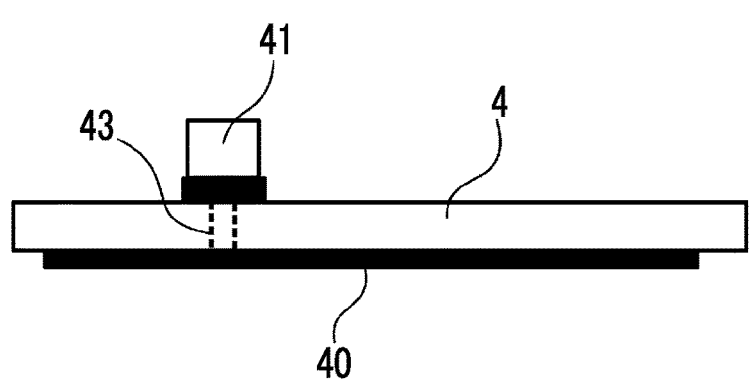
Figure 10C:
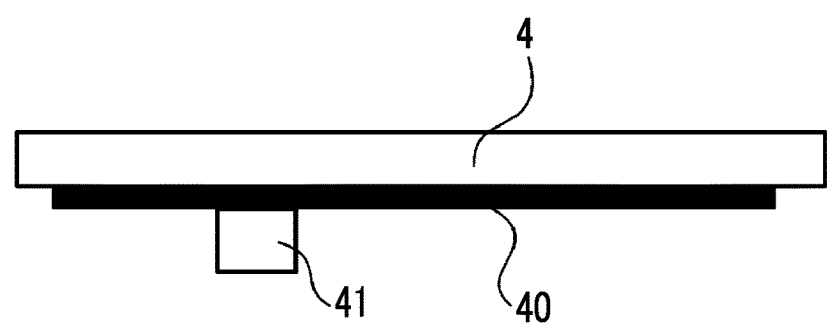
Figure 10D:
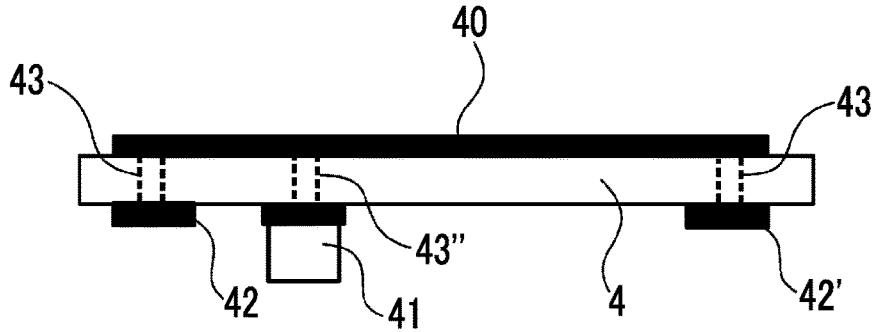

In FIGS. 9A and 9B, the wiring shown in FIG. 9A is formed on the lower surface of the wiring substrate 4, and only the terminator 41 is disposed on the upper surface of the wiring substrate 4 as shown in FIG. 9B. A via for a wiring is formed on the wiring substrate 4 corresponding to the position of the terminator 41. In a case in which this wiring substrate is shown in a side view, the configuration in FIG. 10B is applied. FIG. 10A shows the same configuration as the configuration in FIG. 3 or 5, the wiring 40 is formed on the upper surface of the wiring substrate, and the terminator 41 is disposed on the upper surface in the same manner. In the arrangement shown in FIG. 10B, it is also possible to dispose both the wiring 40 and the terminator 41 on the lower surface of the wiring substrate as shown in FIG. 10C. Further, in the arrangement in FIG. 10A, it is also possible to dispose the wiring 40 on the upper surface of the wiring substrate and dispose the terminator 41 on the lower surface. In this case, the wiring 40 and the terminator 41 are connected by a via 43″.

As shown in FIGS. 10A and 10B, the reason why the terminator is provided on the upper surface of the wiring substrate 4 (surface of the wiring substrate positioned on a back side of the surface facing the modulation substrate) is that, since the electrical signal is converted into heat in the termination resistor (termination section) of the signal wiring (S⁻), the terminator is provided at a position farther from the modulation substrate 1 in order to protect the modulation substrate, which is vulnerable to heat, and to suppress the drift phenomenon due to heat.

Figure 11:
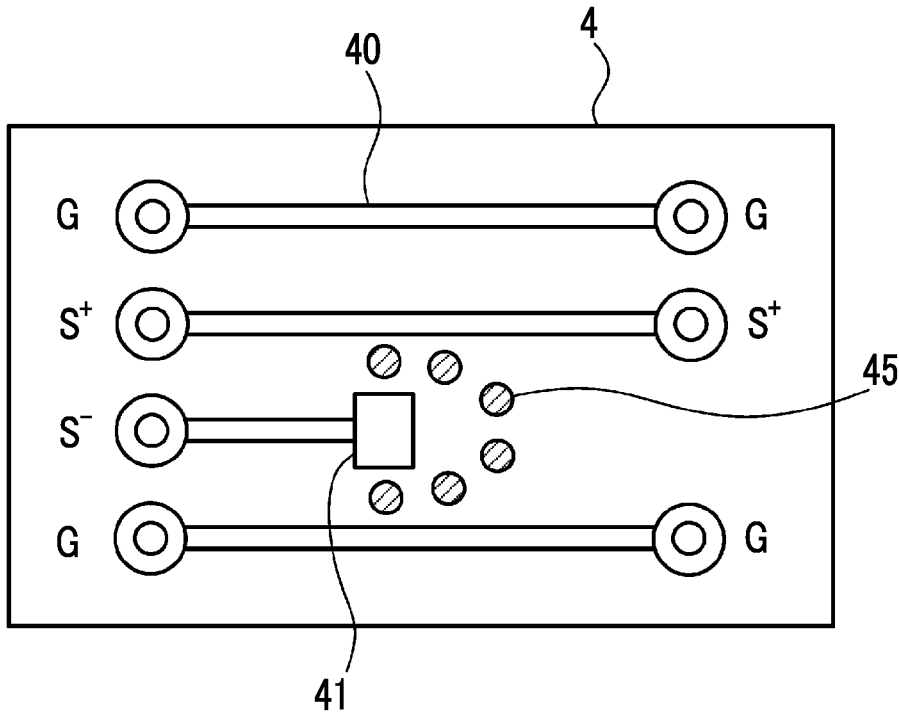
FIG. 11 is a diagram showing an example in which heat radiation means is provided in the wiring substrate in the optical modulator according to the present invention.
Figure 12:
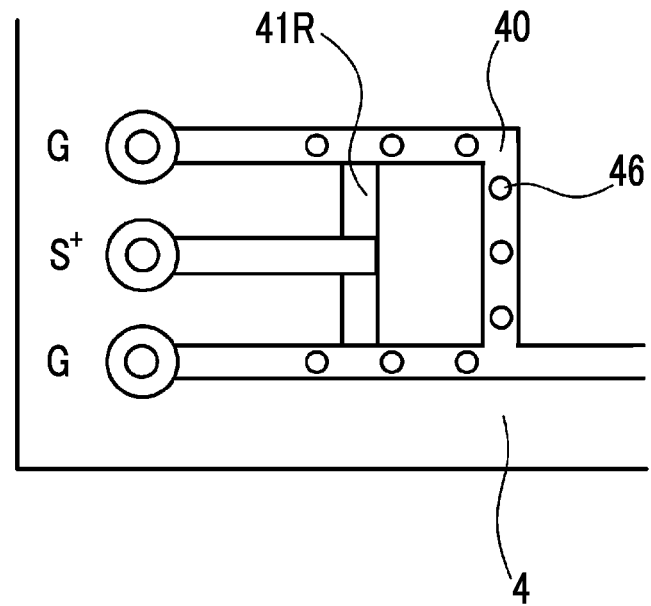
FIG. 12 is a diagram showing another example in which the heat radiation means is provided in the wiring substrate in the optical modulator according to the present invention.

In addition, in order to enhance the heat radiation effect of the wiring substrate 4, heat radiation means can be provided in which a through-hole is disposed around the terminator or a conductive member is disposed in the through-hole as shown in FIG. 11, or a through-via can be provided in a part of the wiring for ground and used as the heat radiation means as shown in FIG. 12. These through-holes (particularly, the through-hole in which conductive member is disposed), the through-via, or the like also contributes to suppressing propagation of the terminated microwave to the modulation substrate side.

It is also possible to provide the optical transmission apparatus having the same effects by including the optical modulator described above and the signal generator (DSP or the like) that generates the modulation signal to be input to the driver circuit element in the optical modulator.

INDUSTRIAL APPLICABILITY

As described above, according to the present invention, it is possible to provide the optical modulator in which the transmission loss from the driver circuit element to the modulation substrate is reduced. Further, it is also possible to provide the optical modulator that can efficiently apply the differential signal output from the driver circuit element to the modulation electrode as the single-ended signal. In addition, it is possible to provide the optical transmission apparatus using these optical modulators.

REFERENCE SIGNS LIST

1: modulation substrate
2: driver circuit element
3: case
4: wiring substrate

The invention claimed is:

1. An optical modulator comprising:

a modulation substrate that includes an optical waveguide and a modulation electrode for modulating a light wave propagating through the optical waveguide;

a driver circuit element that generates a modulation signal to be applied to the modulation electrode; and a case that accommodates the modulation substrate and the driver circuit element, wherein an output terminal that outputs the modulation signal is provided on an upper surface side of the driver circuit element, a wiring substrate including a wiring that electrically connects the output terminal and the modulation electrode is disposed above the driver circuit element and the modulation substrate to straddle both the driver circuit element and the modulation substrate, and the wiring substrate is configured to receive differential signals from the driver circuit element, to output only one signal of the differential signals to the modulation electrode, and to terminate the other signal of the differential signals by a terminator provided in the wiring substrate and not to output the other signal to the modulation electrode.

2. The optical modulator according to claim 1, wherein the wiring of the wiring substrate is electrically connected to the output terminal and the modulation electrode by a flip-chip bonding.

3. The optical modulator according to claim 1, wherein the terminator is provided on a surface of the wiring substrate positioned on a back side of a surface facing the modulation substrate.

4. The optical modulator according to claim 1, wherein heat radiation means for radiating heat generated from the terminator is provided in the wiring substrate.

5. An optical transmission apparatus comprising:

the optical modulator according to any one of claims 1 to 4; and a signal generator that generates a modulation signal to be input to the driver circuit element.

\* \* \* \* \*